United States Patent [19]

Musall et al.

[11] 3,891,396
[45] June 24, 1975

[54] ELASTIC HOLDER FOR CERAMIC MONOLITHIC CATALYST BODIES

[75] Inventors: Reimar Musall; Wilhelm Wolsing, both of Hannover, Germany

[73] Assignee: Kali-Chemie AG., Hannover, Germany

[22] Filed: Feb. 20, 1973

[21] Appl. No.: 333,714

[30] Foreign Application Priority Data
Feb. 29, 1972 Germany............................ 2209487
Feb. 29, 1972 Germany............................ 2209488

[52] U.S. Cl............. 23/288 F; 23/288 FC; 60/299; 165/81; 285/300
[51] Int. Cl............................ F01n 3/14; B01j 9/04
[58] Field of Search.................................. 23/288 F; 60/299–303; 181/72, 47 A, 64 A; 165/81; 285/300, 225, 226, 301, 302, 299

[56] References Cited
UNITED STATES PATENTS
2,506,293  5/1950  Copeland....................... 285/299 X
3,041,149  6/1962  Houdry............................ 23/288 F
3,248,188  4/1966  Chute.............................. 23/288 F
3,692,497  9/1972  Keith et al....................... 23/288 F
3,798,006  3/1974  Balluff............................. 23/288 FC

*Primary Examiner*—James H. Tayman, Jr.
*Attorney, Agent, or Firm*—Ernest F. Marmorek

[57] ABSTRACT

An elastic holder for monolithic catalyst bodies of the type for removing toxic gases from the exhaust of a car. The holder consists of a metallic corrugated tube which simultaneously forms the outer wall of the exhaust conduit. The corrugated tube is mechanically biased with respect to the monolithic catalyst body so as to securely hold the catalyst against an end bearing. Preferably, the catalyst body is provided with a rigid ceramic sleeve having an outer surface of cylindrical or conical shape.

3 Claims, 2 Drawing Figures

3,891,396

ELASTIC HOLDER FOR CERAMIC MONOLITHIC CATALYST BODIES

BACKGROUND OF THE INVENTION

This invention relates to an elastic holder for ceramic monolithic bodies which may be disposed in the exhaust ducts of a car, for example, and which carries a catalyst for removing toxic gases.

The use of ceramic catalyst carriers having a honeycomb-like structure for cleaning exhaust gases and particularly automotive exhaust gases is well known. Such honeycomb bodies combine two advantages. On the one hand they have a large surface per unit of volume, on the other hand their resistance to fluid flow is small. A certain difficulty, however, exists when they are used in devices for removing toxic gases from automotive exhaust gases and this consists in the elastic mounting. Due to the shocks and vibrations which occur during driving the honeycomb bodies are mechanically stressed so that eventually the catalyst carrier is destroyed.

Elastic mountings for such honeycomb bodies have been proposed in the past. For example, U.S. Pat. No. 3,441,382 discloses a catalyst cartridge which consists of a ceramic monolithic catalyst element which is disposed in a metallic housing. Between the catalyst and the housing a heat insulating material such, for example, as refractory bricks and molten α-aluminum oxide and the like is disposed. By means of an adjustable metal spring, a pressure is exerted on the insulating material so that the catalyst body is maintained in its position. Such a mounting, however, has been found not to be sufficiently elastic. The pressure exerted on the catalyst body is too large and is not uniformly distributed to prevent a slow mechanical destruction of the honeycomb body.

Another device for catalytically cleaning automotive exhaust gases is described in the German published Patent Application No. 1,476,507. In this device the monolithic catalyst body is disposed in a cylindrical housing between two annular flanges connected with the housing in a gas tight manner. In the annular space between the housing and the catalyst body there is provided an elastic-like corrugated element such, for example, as a corrugated mesh wire which closely surrounds the catalyst body.

During tests carried out by the automotive industry with rapidly rotating Otto engines, it has been found that the corrugated, metallic mesh wire inserts do not withstand the high thermal and mechanical stresses even if the metallic mesh consists of steel capable of withstanding high temperatures. The ceramic body imbedded in the metal mesh begins to migrate when the elastic property exerted by the wire mesh is lost. Due to the high vibration a rapid destruction of the ceramic body takes place.

It is accordingly an object of the present invention to provide an elastic holder for monolithic catalyst bodies capable of withstanding high temperatures and high mechanical stresses caused by vibration and the like.

SUMMARY OF THE INVENTION

The elastic holder of the present invention for ceramic monolithic catalyst bodies avoids these disadvantages. It consists of a metallic, corrugated tube which simultaneously forms the outer wall of an exhaust conduit. It is provided with a mechanical bias in order to safely hold the monolithic catalyst bodies and to press it against an end bearing. The catalyst body may be rigidly connected with a ceramic sleeve having an outer surface of cylindrical or conical shape.

According to an alternative embodiment of the invention the monolithic body is surrounded at its outer surface with an elastic heat resistant material, preferably a ceramic wadding. This material is disposed in the space between the corrugated tube and the catalyst body or its ceramic sleeve. The corrugated tube consists of an elastic material which does not lose its elastic properties at the temperatures which may prevail. Preferably, a heat resistant steel is used. It also serves as the outer wall of an exhaust conduit. By means of its spring force it clamps the catalyst body.

In order to accommodate the high clamping force exerted on the monolithic body it may be surrounded with a ceramic hollow cylinder or cone. This supporting sleeve which may have a thickness of several millimeters may be connected rigidly during the manufacture, for example, by a firing process with the catalyst body Alternatively, the catalyst body may be cemented with a heat resistant cement to the ceramic sleeve. The sleeve at the same time serves as a thermal insulation of the corrugated tube to protect it from the hot exhaust gases. In the case of monolithic catalyst bodies which are mechanically stronger, the clamping force may be directly exerted by the monolithic body so that there is no need for a ceramic sleeve.

During the assembly process the corrugated tube is provided with a mechanical bias so that it clamps the catalyst body or its sleeve against an end bearing. The magnitude of the elastic force may be controlled by the number and depth of the grooves and by the thickness of the metal of the corrugated tube in accordance with the mechanical properties of the monolithic body to be clamped. The catalyst body or the ceramic sleeve rigidly connected therewith is provided with a flange which may either be rigidly connected with the corrugated tube or which may be disposed in the grooves of the corrugated tube as individual segments. The annular flange and the catalyst body or its ceramic sleeve need not be disposed adjacent to each other. Between them there may be disposed a packing disk.

The corrugated tube is protected against excessive temperature in that it is immediately in contact with the surrounding air by means of its large surface. As a further protection from the hot exhaust gases there may be provided a space between the catalyst body or its ceramic sleeve on the one hand and the corrugated tube on the other hand which may be filled with a ceramic insulating material such, for example, as ceramic wadding to increase the insulating effect. The ceramic insulating material not only serves as an additional heat insulation but also prevents, with even greater safety, the flow of gases through the gap between the corrugated tube and the catalyst body or its ceramic sleeve. Furthermore, the insulating material, particularly when it has elastic properties, may serve to hold the monolithic body at its circumference. In case the ceramic sleeve has a conical outer surface, the compacting of the insulating material may be compensated by the axial spring action of the corrugated tube. In order not to influence the mechanical spring bias of the corrugated tube, the ceramic wadding should preferably not penetrate into the grooves of the corrugated tube. In order to protect the corrugated tube there may be provided a hollow cylinder of thin heat resistant sheet material which on the one side is rigidly connected with the corrugated tube and on the other side has a play of a few millimeters. This thin cylinder of sheet material additionally prevents bending of the corrugated tube across the axis between the annular flanges. It also serves the function of an additional radiation protecting element.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figures 1, 2:
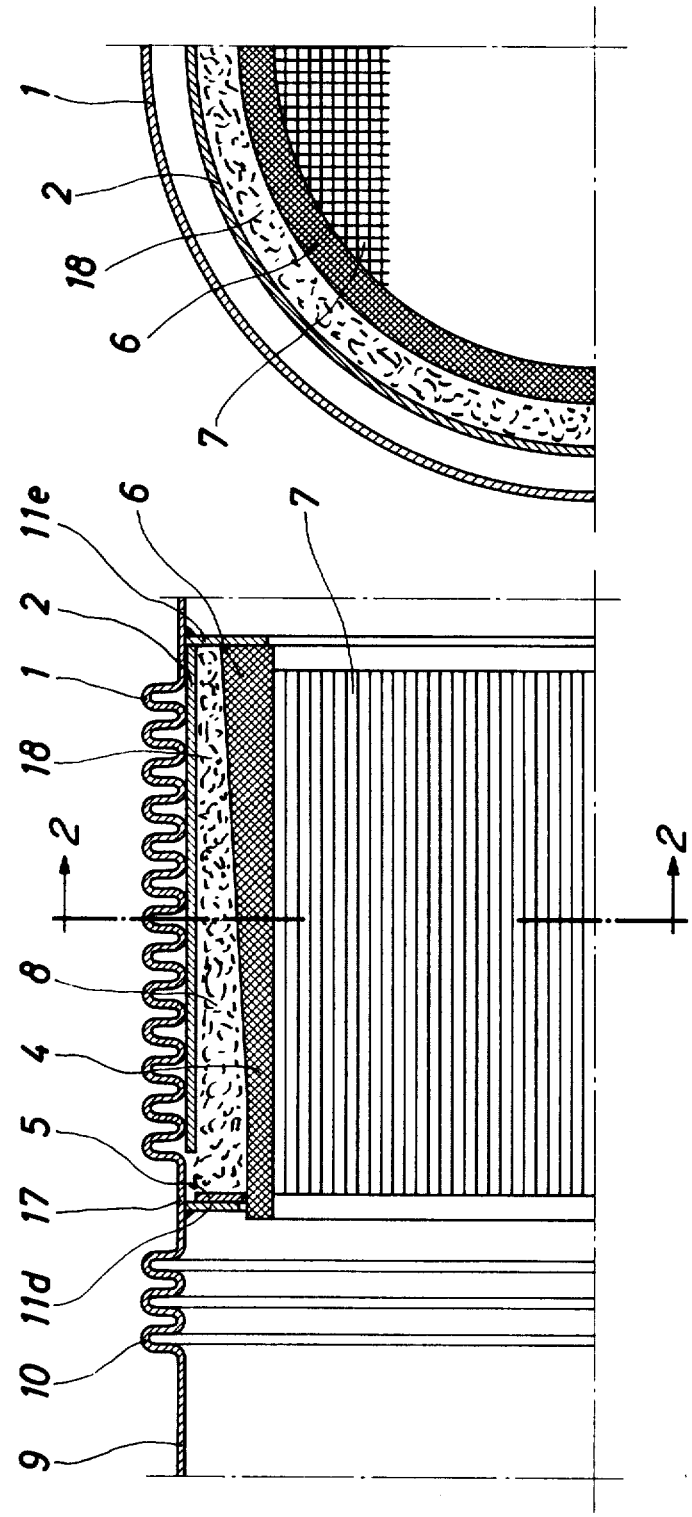

Referring now to FIGS. 1 and 2, there is illustrated an elastic holder in accordance with the present invention. The holder includes a corrugated tube 1 of heat resistant material having connected therewith annular flanges 11d and 11e. The corrugated tube 1 surrounds the monolithic catalyst body 7 which may be provided with a ceramic sleeve 6. The space 18 between sleeve 6 and the corrugated tube 1 may be filled with insulating material 8. A cylinder 2 consisting of sheet material is rigidly connected at one side with the corrugated tube 1.

According to the embodiment of FIGS. 1 and 2, elastic connection pieces are provided at the ends of the corrugated tube or housing 1. The connection pieces 9 obtain their elasticity because they are also provided with waves or grooves 10 following a cylindrical transition piece 17. The connection pieces 9 may consist of the same material as the corrugated tube 1 or of some other material. They may be made mechanically softer than the corrugated tube 1 by the selection of a thinner sheet material and by providing higher and a greater number of grooves. The connection pieces 9 may also consist of a smooth tube. The provision of the grooves 10 is not absolutely necessary.

The catalyst body 7 is cemented into a ceramic sleeve 6 or rigidly connected therewith by a firing process. The ceramic sleeve 6 has outwardly at one end a cylindrical form which then merges into a conical shape and bears against the flange 11e. Flange 11d has play with respect to the ceramic sleeve 6. Between the metal tube 2 and the ceramic sleeve 6 there is provided an annular space 18 which may be filled with a compressible insulating material such, for example, as ceramic wadding 8. Over the cylindrical portion 4 of the ceramic sleeve 6 there may be disposed a packing disk 5 which is easily displaceable.

The corrugated tube 1 is provided with a mechanical bias during assembly so that it operates as a drawspring toward the sleeve 6 by way of the insulating material 8. By displacing the packing disk 5 over the cylindrical portion 4 the insulating material 8 may be compressed even when it has compacted itself after a long operating period so that the annular space 18 is completely filled therewith. In this manner the sleeve 6 and accordingly the catalyst body 7 is rigidly held at its circumference in the desired position.

What is claimed is:

1. An elastic holder, for use in holding a monolithic catalyst body suitable for removing toxic gases from an exhaust gas passage, such holder comprising:

a metallic corrugated tube forming the outer wall of said exhaust gas passage;

a ceramic sleeve having two end portions and being positioned within said corrugated tube surrounding, and being rigidly connected to, said catalyst body;

one end portion of said sleeve being of cylindrical external shape and the sleeve increasing in diameter towards the other end portion;

an annular space defined between said metallic, corrugated tube and said ceramic sleeve filled with ceramic wadding; and end bearings for said catalyst body composed of annular flanges rigidly secured to said corrugated tube, each flange being disposed near an end portion of said sleeve, said corrugated tube being provided with an initial tension adapted for pressing one of said annular flanges against said ceramic sleeve at the other end portion thereof to restrain sleeve movement in one axial direction, the other flange surrounding the cylindrical end portion of said ceramic sleeve with clearance, whereby the wadding will be compressed and in cooperation with the increasing diameter of the sleeve, will restrain sleeve movement in the opposite axial direction.

2. An elastic holder, as claimed in claim 1, including a movable annular disc disposed near the clearance between said sleeve and said corrugated tube, thereby reducing the size of said clearance.

3. An elastic holder, as claimed in claim 1, including a metallic protective sleeve secured to one side of said corrugated tube and provided with play at the other end thereof.

* * * * *